UNITED STATES PATENT OFFICE.

ARTHUR M. WILLIAMSON, OF NIAGARA FALLS, NEW YORK, ASSIGNOR TO INTERNATIONAL ACHESON GRAPHITE COMPANY, OF NIAGARA FALLS, NEW YORK, A CORPORATION OF NEW JERSEY.

LUBRICATING-BLOCK.

1,100,335. Specification of Letters Patent. Patented June 16, 1914.

No Drawing. Application filed March 22, 1911. Serial No. 616,229.

*To all whom it may concern:*

Be it known that I, ARTHUR M. WILLIAMSON, a citizen of the United States, residing at Niagara Falls, in the county of Niagara and State of New York, have invented certain new and useful Improvements in Lubricating-Blocks, of which the following is a specification.

This invention relates to the preparation of lubricating sticks or blocks which contain graphite as an essential constituent. Such blocks are applicable for lubrication in a variety of ways, including the lubrication of wheel flanges, etc., and have heretofore been prepared from graphite powder or flake and a material serving as a bond. Among the bonds used have been clay, which is a non-lubricant; sulfur, which has little or no lubricating value; amorphous carbon or carbonaceous residues of tar, which are also non-lubricants; and other mixtures, including organic bonds of various kinds. The bonds used are necessarily of such nature as to constitute a firm binder for the graphite under conditions of use, and consequently they can add nothing to the lubricating value of the block, and usually detract greatly from such value.

According to the present invention a coherent, self-supporting body of substantially pure graphite, free from a non-graphitic bond, and possessing a degree of porosity and hardness suitable for the purpose in view, is impregnated wtih a material which is capable of application in a liquid state and which is capable of increasing the lubricating value of the graphite. The graphite may be cut or machined into sticks, blocks, buttons or the like according to its intended purpose, either before or after impregnation. For example, I may treat a block or rod of pure homogeneous Acheson-graphite, either before or after cutting to the desired shape and size, by impregnating it, either by soaking or with the aid of a vacuum, or of vacuum and pressure, with a material having the required properties. For this purpose there may be used mineral and other non-drying oils such as are commonly employed for lubrication; fats, either liquid or solid; mineral grease such as petrolatum; lubricating greases and soaps of various kinds; glycerin; and in general any substance which may be applied in the liquid state and which will increase the lubricating value of the block, such substances being included under the general term "lubricant." If the lubricant be a solid at normal temperatures it is brought to the required liquid state either by heat or by solution in water or other appropriate solvent.

As a specific example of the invention, I have found that a block of Acheson-graphite having a porosity of about 27% was capable of absorbing approximately 15% by weight of an engine-oil having a specific gravity of 0.9.

Blocks impregnated as above possess certain qualities which are of great technical importance, and which are not possessed either by non-impregnated graphite blocks, or by blocks consisting of finely divided graphite and a binder. For example, a series of blocks consisting respectively of untreated Acheson-graphite, oil-impregnated Acheson-graphite, and a commercial lubricating block comprising finely divided graphite and a binder, were presented for equal periods of time and under equal pressures to a steel shaft two inches in diameter, revolving at the rate of 600 R. P. M. It was found that the untreated block glossed over, and after a short time lost practically no weight, and that little or no graphite appeared on the shaft. Using the oil-impregnated block, the shaft was quickly coated with a thin layer of graphite, and when this was continuously removed it was as rapidly replaced. The commercial block composed of comminuted graphite and a binder was found to lose weight at approximately the same rate as the impregnated block, but it was found that approximately two-thirds of the loss of weight was represented by material which flaked off and was lost, instead of adhering to the shaft. No loss of this latter character could be detected in the use of the impregnated block.

I claim:—

A lubricating block consisting essentially of a self-supporting, coherent body of artificial graphite free from a non-graphitic bond and impregnated with a lubricant.

In testimony whereof, I affix my signature in presence of two witnesses.

ARTHUR M. WILLIAMSON.

Witnesses:
 ORRIN E. DUNLAP,
 WM. ACHESON SMITH.

Copies of this patent may be obtained for five cents each, by addressing the "Commissioner of Patents, Washington, D. C."